United States Patent
Wang et al.

(10) Patent No.: US 7,611,632 B1
(45) Date of Patent: Nov. 3, 2009

(54) METHOD OF CONDITIONING MIXED LIQUOR USING A TANNIN CONTAINING POLYMER

(75) Inventors: Sijing Wang, Shanghai (CN); Stephen Robert Vasconcellos, Doylestown, PA (US); Jianqiu Wang, Beijing (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/266,853

(22) Filed: Nov. 7, 2008

(51) Int. Cl.
*C02F 1/00* (2006.01)

(52) U.S. Cl. ................................... 210/698
(58) Field of Classification Search ............... 210/698
See application file for complete search history.

(56) References Cited

U.S. PATENT DOCUMENTS

| | | | |
|---|---|---|---|
| 4,558,080 A | 12/1985 | Quamme et al. | |
| 4,734,216 A | 3/1988 | Kelly et al. | |
| 4,781,839 A | 11/1988 | Kelly et al. | |
| 4,990,270 A | 2/1991 | Meister | |
| 5,643,462 A | 7/1997 | Chen et al. | |
| 5,977,287 A * | 11/1999 | Mitchell et al. ............. | 528/129 |
| 6,478,986 B1 | 11/2002 | Lamb et al. | |
| 6,723,245 B1 | 4/2004 | Collins et al. | |
| 6,872,312 B1 | 3/2005 | Shah et al. | |
| 6,926,832 B2 | 8/2005 | Collins et al. | |
| 7,378,023 B2 | 5/2008 | Yoon et al. | |
| 2004/0168980 A1 * | 9/2004 | Musale et al. ............... | 210/639 |
| 2006/0272198 A1 | 12/2006 | Yoon et al. | |

OTHER PUBLICATIONS

A. Pizzi in "Condensed Tannin for Adhesives", Ind. Eng. Chem. Prod. Res. Dev. 1982, 21, pp. 359-369.

* cited by examiner

*Primary Examiner*—Chester T Barry
(74) *Attorney, Agent, or Firm*—Global Patent Operation

(57) ABSTRACT

Disclosed is a method of conditioning mixed liquor in a membrane bioreactor (MBR) system comprising adding an effective amount of a tannin containing polymer to the mixed liquor. Also disclosed is a method of improving flux in an MBR system comprising adding an effective amount of a tannin containing polymer to mixed liquor of the MBR. An effective amount of the tannin containing polymer may be added separately or in combination with other water soluble sludge filterability improvement polymers or sludge filterability improvement inorganic coagulants to the mixed liquor of the MBR. In one embodiment, the tannin containing polymer is a water soluble or dispersible copolymer of a tannin and a cationic monomer. In another embodiment, the tannin containing polymer is a water soluble or dispersible polymer of a tannin, a cationic monomer, and at least one monomer.

26 Claims, 1 Drawing Sheet

METHOD OF CONDITIONING MIXED LIQUOR USING A TANNIN CONTAINING POLYMER

BACKGROUND OF THE INVENTION

1. Field of the Invention

The present invention relates to compositions of tannin containing polymers, and in particular relates to methods of using the same for conditioning microbial mixed liquor and improving flux in membrane bioreactor (MBR) systems.

2. Description of Related Art

Biological treatment of wastewater for removal of dissolved organics is well known and is widely practiced in both municipal and industrial plants. This biological process is generally known as the "activated sludge" process in which micro-organisms consume organic compounds through their growth. The process necessarily includes sedimentation of the micro-organisms or "biomass" to separate it from the water and complete the process of reducing Biological Oxygen Demand (BOD) and TSS (Total Suspended Solids) in the final effluent. The sedimentation step is typically done in a clarifier unit. Thus, the biological process is constrained by the need to produce biomass that has good settling properties. These conditions are especially difficult to maintain during intermittent periods of high organic loading and the appearance of contaminants that are toxic to the biomass.

Typically, an activated sludge treatment has a conversion ratio of organic materials to sludge of up to about 0.5 kg sludge/kg COD (chemical oxygen demand), thereby resulting in the generation of a considerable amount of excess sludge that must be disposed of. The expense for the excess sludge treatment has been estimated at 40 to 60 percent of the total expense of a wastewater treatment plant. Moreover, a conventional disposal method of landfilling sludge may cause secondary pollution problems. Therefore, interest in methods to reduce the volume and mass of excess sludge has been growing rapidly.

Membranes coupled with biological reactors for the treatment of wastewater are well known, but are not widely practiced. In these systems, ultrafiltration (UF), microfiltration (MF), or nanofiltration (NF) membranes replace sedimentation of biomass for solids-liquid separation. A membrane can be installed in a bioreactor tank or in an adjacent tank where mixed liquor is continuously pumped from the bioreactor tank and back produces effluent with much lower total suspended solids (TSS), typically less than 5 mg/L, compared to 20 to 50 mg/L from a clarifier.

More importantly, membrane biological reactors (MBR) de-couple the biological process from the need to settle the biomass, since the membrane sieves the biomass from the water. This allows operation of the biological process at conditions that would be untenable in a conventional system including: (1) high mixed liquor suspended solids (bacteria loading) of 10 to 30 g/L, (2) extended sludge retention time, and 3) short hydraulic retention time. In a conventional system, such conditions may lead to sludge bulking and poor settleability.

The benefits of an MBR operation include low sludge production, complete solids removal from the effluent, effluent disinfection, combined COD, solids and nutrient removal in a single unit, high loading rate capability, and minimal problems with sludge bulking. Disadvantages include aeration limitations, membrane fouling, and membrane costs.

Membrane fouling can be attributed to surface deposition of suspended or dissolved substances. An MBR membrane interfaces with the biomass which contains aggregates of bacteria or "flocs", free bacteria, protozoan, and various dissolved microbial products (SMP). The term SMP has been adopted to define the organic compounds that are released into the bulk microbial mixed liquor from substrate metabolism (usually biomass growth) and biomass decay.

In operation, the colloidal solids and SMP have the potential of depositing on the surface of the membrane. Colloidal particles form layers on the surface of the membrane, called a "cake layer." MBR processes are designed to use rising coarse air bubbles to provide a turbulent cross flow velocity over the surface of the membrane. This process helps to maintain the flux through the membrane, by reducing the build up of a cake layer at the membrane surface.

Compared to a conventional activated sludge process, floc (particle) size is reportedly much smaller in typical MBR units. Small particles can plug the membrane pores, a fouling condition that may not be reversible. Since MBR membrane pore size varies from about 0.04 to about 0.4 micrometers, particles smaller than this can cause pore plugging. Pore plugging increases membrane resistance and decreases membrane flux.

Efficient and stable operation of MBR systems largely depends on the conditions and qualities of the biological populations of the biomass in the MBR system. The characteristics of the mixed liquor, including viscosity, extracellular polymeric substances (EPS), floc size, and colloidal and soluble organic substances, affect membrane filterability. While traditional approaches mostly rely on optimization of hydrodynamics and air scouring to reduce membrane fouling in MBR systems, new efforts are more devoted to coagulate and flocculate the activated sludge by adding chemicals and thereby to bind colloids and other mixed liquor components in flocs. These filterability enhancement chemicals can not only have a positive impact to decrease soluble foulants in the bulk phase and also improve the hydraulic permeability of the cake formed on the surface of the membrane.

Recently increasing efforts have been devoted to improve microbial mixed liquor filterability and enhance membrane flux in MBR systems. Options include use of inorganic coagulants such as ferric and aluminum salts and aluminum polymers, powdered activated carbon (PAC) and other type of inert particles (e.g. resins), and water soluble polymers. Use of inorganic coagulants will increase sludge generation and are only applicable to a narrow pH range. Addition of powdered activated carbon to MBR systems will not only increase sludge concentration, it may also cause irreversible permeability loss due to membrane pore plugging by PAC, and membrane wear due to the abrasiveness of the PAC. These problems will exaggerate and additional fouling may develop when the added PAC concentration becomes higher (e.g. 600 mg/L or above).

Various patents disclose the use of water-soluble polymers in MBRs for biomass conditioning and membrane flux enhancement. U.S. Pat. No. 6,723,245 discloses a method of using water soluble cationic polymers in MBRs. U.S. Pat. No. 6,872,312 discloses a method of using high molecular weight water soluble polymers in MBR systems. U.S. Pat. No. 6,926,832 discloses a method of using water soluble polymers in an MBR. U.S. Publication No. 2004/0168980 discloses a combination polymer treatment for flux enhancement in a MBR. U.S. Publication 2006/0272198 discloses a method for improving flux in an MBR. U.S. Pat. No. 7,378,023 discloses a method of using cationic polymers having a molecular weight greater than about 200,000 in an MBR for industrial wastewater treatment. The polymers in U.S. Pat. Nos. 6,723,245, 6,872,312, 6,926,832 and 7,378,023 and U.S. Publication Nos. 2004/0168980 and 2006/0272198 include polymers of (meth)acrylamide and one or more cationic monomers, cationic polymers having a molecular weight greater than about 200,000 Daltons, copolymer of acrylamide and one or more cationic monomers, and other polyamine coagulants. They do not claim tannin-containing copolymers.

U.S. Pat. Nos. 4,558,080, 4,734,216 and 4,781,839 disclose a tannin based polymer obtained by reacting tannin with an amino compound and an aldehyde under acidic conditions for use as a flocculant. The manufacturing process requires careful monitoring of the pH and intermediate viscosity during the reaction to prevent the batch from gelling. The long-term stability of the product and the amount of residual amine and formaldehyde in the solution may cause handling concerns.

U.S. Pat. No. 4,558,080 discloses the production of stable tannin-based flocculants made by polymerizing tannin with an aldehyde such as formaldehyde and an amino compound, such as monoethanolamine, while monitoring the viscosity of the reacting mixture. U.S. Pat. No. 4,734,216 discloses a flocculating compound comprised of polymerized tannin described in the above referenced patent in combination with an inorganic flocculant such as aluminum sulfate or iron chloride. U.S. Pat. No. 5,643,462 discloses a composition comprised of a water soluble/dispersible tannin containing polymer obtained by polymerizing ethylenically unsaturated monomers with tannin, the method of preparing the same and their use for water clarification. U.S. Pat. No. 6,478,986 teaches a process for the production of a quaternary tannate as a coagulating/flocculating agent, and its use for treating drinking water and water used in industry. The coagulating/flocculating agent is a vegetable polyelectrolytic cation. U.S. Pat. No. 4,990,270 discloses a thickening agent prepared by graft copolymerizing acrylamide and cationic monomer with water insoluble lignin in a calcium chloride/dimethylsulfoxide solution. The procedure is quite complicated and requires precipitation in acetone and filtration, and dialysis to isolate the product. The resulting material is used for enhanced oil recovery.

Accordingly, a need exists for time-saving and cost-effective polymer based chemicals for membrane flux enhancement, MBR efficiency improvement, and mixed liquor filterability enhancements.

SUMMARY OF THE INVENTION

Disclosed is a method of conditioning mixed liquor in a membrane bioreactor (MBR) system which comprises adding an effective amount of a tannin containing polymer to the mixed liquor. Also disclosed is a method of improving flux in a membrane bioreactor (MBR) system comprising adding an effective amount of a tannin containing polymer to mixed liquor of the MBR.

In one embodiment of the present invention, the tannin containing polymer is a water soluble or dispersible copolymer of a tannin and a cationic monomer selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

In another embodiment, the tannin containing polymer is a water soluble or dispersible polymer of a tannin, a cationic monomer selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide and diallyl dimethyl ammonium chloride, and at least one monomer selected from the group consisting of an anionic monomer and a nonionic monomer.

In an alternate embodiment, a method of conditioning mixed liquor in an MBR system which comprises adding an effective amount of a tannin containing polymer in combination with adding an effective amount of a sludge filterability improvement inorganic coagulant to the mixed liquor is disclosed.

In another embodiment, a method of improving flux in an MBR system comprising adding an effective amount of a tannin containing polymer in combination with adding an effective amount of a sludge filterability improvement inorganic coagulant to mixed liquor is disclosed.

An effective amount of the tannin containing polymer, alone or in combination with other water soluble sludge filterability improvement polymers or in combination with a sludge filterability improvement inorganic coagulants, are added to the activated sludge for conditioning the activated sludge and for membrane flux enhancement in MBR systems. The tannin containing polymers, other types of water soluble polymers, and inorganic coagulants can be added separately or in a combination thereof, to the activated sludge in the MBR.

The various features of novelty which characterize the invention are pointed out with particularity in the claims annexed to and forming a part of this disclosure. For a better understanding of the invention, its operating advantages and benefits obtained by its uses, reference is made to the accompanying drawings and descriptive matter. The accompanying drawings are intended to show examples of the many forms of the invention. The drawings are not intended as showing the limits of all of the ways the invention can be made and used. Changes to and substitutions of the various components of the invention can of course be made. The invention resides as well in sub-combinations and sub-systems of the elements described, and in methods of using them.

DETAILED DESCRIPTION OF THE INVENTION

Figure 1:
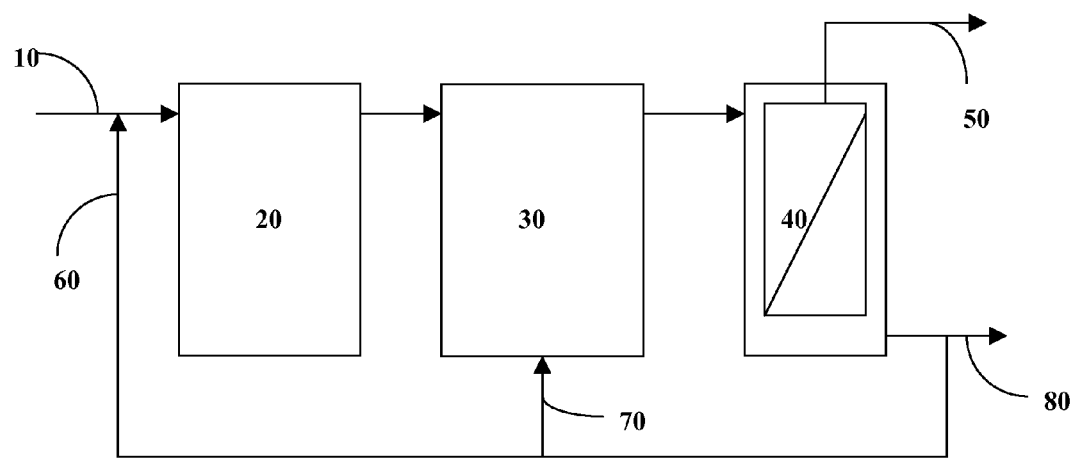
FIG. 1 is a schematic of a typical example of an MBR in accordance with an embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges included herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus.

The singular forms "a," "an" and "the" include plural referents unless the context clearly dictates otherwise.

"MBR" means membrane bioreactor or membrane biological reactor.

"Mixed liquor" or "activated sludge" means a mixture of wastewater, microorganisms used to degrade organic materials in the wastewater, organic-containing material derived from cellular species, cellular by-products and/or waste products, or cellular debris. Mixed liquor can also contain colloidal and particulate material (i.e. biomass/biosolids) and/or soluble molecules or biopolymers (i.e. polysaccharides, proteins, etc.).

"Mixed liquor suspended solids" ("MLSS") means the concentration of biomass which is treating organic material, in the mixed liquor.

"Excess activated sludge" refers to the activated sludge that is continuously pumped from the bioreactor in order to maintain a constant sludge age in the bioreactor.

DADMAC is diallyldimethyl ammonium chloride; DMAEA/MCQ is dimethylaminoethylacrylate methyl chloride quaternary salt; DMAEA/BCQ is dimethylaminoethylacrylate benzyl chloride quaternary salt; DMAEM/MCQ is dimethylaminoethylmethacrylate methyl chloride quaternary salt; and DMAEM/BCQ is dimethylaminoethylmethacrylate benzyl chloride quaternary salt.

The present invention discloses and claims a composition comprising a tannin containing polymeric material. In one embodiment of the present invention, a method of conditioning mixed liquor in a membrane bioreactor (MBR) system which comprises adding an effective amount of a tannin containing polymer to the mixed liquor is disclosed. In another embodiment, a method of improving flux in an MBR system comprising adding an effective amount of a tannin containing polymer to mixed liquor of the MBR is disclosed.

Tannin, also called tannic acid, occurs in the leaf, branch, bark and fruit of many plants. As disclosed by A. Pizzi in "Condensed Tannin for Adhesives", Ind. Eng. Chem. Prod. Res. Dev. 1982, 21, pages 359-369, the natural tannins can be categorized as "hydrolyzable" tannin and "condensed" tannin. The composition and structure of tannin will vary with the source and the method of extraction, but the empirical structure is given as $C_{76}H_{52}O_{46}$ with many OH groups attached to the aromatic rings. The tannin disclosed in the present invention is a condensed tannin type including but not limited to those derived from Quebracho, Mimosa and Sumac. However, hydrolyzable tannins are also contemplated to be within the scope of this invention.

The tannin component can be obtained from various wood and vegetation materials found throughout the world. Tannins are a large group of water-soluble complex organic compounds. Almost every tree or shrub that grows contains some tannins in the leaves, twigs, barks, wood or fruit. Examples of barks are wattle, mangrove, oak, eucalyptus, hemlock, pine, larch and willow. Examples of woods are the quebracho chestnut, oak and urunday. Examples of fruits are myrobalans, valonia, divi-divi, tara and algarrobilla. Examples of leaves are sumac and gambier and examples of roots are canaigre and palmetto. These natural tannins can be categorized into the traditional "hydrolysable" tannins are "condensed" tannins. Condensed tannin extracts are those manufactured from the bark of the black wattle tree, from the wood of the quebracho tree, from the bark of the hemlock tree and from the bark of several commonly used pine species. The preparation of the wattle and quebracho extracts is a well-established industrial practice and they are freely available in considerable amounts.

In one embodiment of the present invention, a method of conditioning mixed liquor in a membrane bioreactor (MBR) system which comprises adding an effective amount of a tannin containing polymer to the mixed liquor is disclosed. In another embodiment a method of improving flux in an MBR system which comprises adding an effective amount of a tannin containing polymer to mixed liquor of the MBR is disclosed. These water soluble tannin containing polymers may be used to condition the biomass or activated sludge of MBR systems and adding an effective amount of the tannin containing polymer can improve filtering characteristics of sludge substantially. In one embodiment, adding an effective amount of the water soluble polymers to the mixed liquor or activated sludge of an MBR can greatly improve sludge filterability, thereby reducing the risk to the MBR associated with handling peak flows, reducing membrane cleaning requirements, and the MBR system can be designed at higher flux rate. In another embodiment, adding an effective amount of the tannin containing polymer allows for mixed liquor filterability enhancement in MBR systems. In an alternate embodiment, adding an effective amount of the tannin containing polymer improves filtering characteristics of sludge.

The present invention relates to water soluble or dispersible tannin containing polymer compositions. In one embodiment of the present invention, the tannin containing polymer is comprised of a water soluble or dispersible copolymer of a tannin and a cationic monomer. In another embodiment, the tannin containing polymer composition comprises a copolymer of tannin, a cationic monomer, and at least one monomer selected from the group consisting of an anionic monomer and a nonionic monomer. In U.S. Pat. No. 5,643,462, assigned to the Assignee of the present invention, the composition of these tannin-based polymers is disclosed. U.S. Pat. No. 5,643,462 is incorporated by reference herein in its entirety. The tannin containing polymers are obtained by polymerizing ethylenically unsaturated monomers with tannin. The resulting tannin copolymer has amphoteric character, through the hydroxyl and carboxyl groups on the tannin backbone and the functionalized cationic moiety due to the dimethylaminoethylacrylate methylchloride.

Cationic polymer means a polymer having an overall positive charge. A cationic polymer is typically prepared by vinyl addition polymerization of one or more cationic monomers, by copolymerization of one or more cationic monomers with one or more nonionic monomers, or by polymerization of the cationic monomers with one or more anionic monomers and optionally one or more nonionic monomers to produce an amphoteric polymer.

The cationic monomer is selected from a group containing ethylenically unsaturated quaternary ammonium, phosphonium or sulfonium ions. Cationic monomers, include, but are not limited to, quaternary ammonium salts of dialkylaminoalkyl(meth)acrylamides, dialkylaminoalkyl(meth)acrylates and diallyl dialkyl ammonium chloride.

In one embodiment of the present invention, the cationic monomer is selected from the group including, but are not limited to, methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyldiethyl ammonium chloride. In an alternate embodiment, the cationic monomer is methyl chloride quaternary salt of diethylaminoethyl acrylate.

The nonionic monomer is selected from the group of ethylenically unsaturated nonionic monomers which comprise but are not limited to acrylamide, methacrylamide, N-methylolacrylamide, N,N-dimethyl-acrylamide; lower alkyl ($C_1$-$C_6$) esters including vinyl acetate, methyl acrylate, ethyl acrylate, and methyl methacrylate; hydroxylated lower alkyl ($C_1$-$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. In one embodiment, the nonionic monomer is selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, and ethoxylated allyl ether of polyethylene glycol and polypropylene glycol. In another embodiment, the nonionic monomers are selected from the group consisting of allyl glycidyl ether and acrylamide.

The anionic monomer is selected from the group containing ethylenically unsaturated carboxylic acid or sulfonic acid functional groups. In one embodiment, the anionic monomers include, but are not limited to, acrylic acid, methacrylic acid, vinyl acetic acid, itaconic acid, maleic acid, allylacetic acid, styrene sulfonic acid, 2-acrylamido-2-methyl propane sulfonic acid (AMPS®), and 3-allyloxy-2-hydroxypropane sulfonic acids and salts thereof. In an alternate embodiment, the anionic monomer is acrylic acid.

The MBR may be further treated by adding an effective amount of one or more other water soluble sludge filterability improvement polymers, or combinations thereof, to the mixed liquor. In an alternate embodiment, the MBR may be further treated by adding an effective amount of sludge filterability improvement inorganic coagulants to the activated sludge.

An effective amount of the tannin containing polymer, alone or in combination with other water soluble sludge filterability improvement polymers or in combination with sludge filterability improvement inorganic coagulants, are added to the activated sludge for conditioning the activated sludge and for membrane flux enhancement in MBR systems.

In one embodiment of the present invention, a method of conditioning mixed liquor in an MBR system which comprises adding an effective amount of a tannin containing polymer in combination with adding an effective amount of other water soluble sludge filterability improvement polymers, or combinations thereof, to the mixed liquor is disclosed.

Other water soluble sludge filterability improvement polymers include, but are not limited to, all water soluble polymers for conditioning the activated sludge for filterability improvement, such as polyDADMAC (diallyldimethyl ammonium chloride) and polyMETAC ((methacryloyloxy) ethyl] trimethylammonium chloride). In an alterante embodiment other water soluble sludge filterability improvement polymers include copolymers of N,N-Dimethylaminoethyl Acrylate Methyl Chloride (AETAC) and acrylamide (AM).

In one embodiment, a method of conditioning mixed liquor in a membrane bioreactor (MBR) system which comprises adding an effective amount of a tannin containing polymer in combination with adding an effective amount of a sludge filterability improvement inorganic coagulant to the mixed liquor is disclosed. In another embodiment, the inorganic coagulant is selected from the group consisting of Ca, Mg, Al, and Fe, and combinations thereof. In an alternate embodiment, the inorganic coagulant is selected from the group consisting of Al and Fe, and combinations thereof.

In an alternate embodiment, a method of improving flux in an MBR system is disclosed which comprises adding an effective amount of a tannin containing polymer in combination with adding an effective amount of other water soluble sludge filterability improvement polymers, or combinations thereof, to mixed liquor of the MBR.

In another embodiment, a method of improving flux in an MBR system which comprises adding an effective amount of a tannin containing polymer in combination with adding an effective amount of a sludge filterability improvement inorganic coagulant to mixed liquor is disclosed. In one embodiment, the inorganic coagulant is selected from the group consisting of Ca, Mg, Al, and Fe, and combinations thereof. In an alternate embodiment, the inorganic coagulant is selected from the group consisting of Al and Fe, and combinations thereof.

The tannin containing polymers, other types of water soluble sludge filterability improvement polymers, and sludge filterability improvement inorganic coagulants can be added separately or in a combination thereof, to the activated sludge in the MBR.

In one embodiment, the resulting tannin containing polymer contains from 10% to 90% by weight of tannin, 20% to 80% by weight of cationic monomer, 0% to 30% by weight of nonionic monomer, and 0% to 20% by weight of anionic monomer, provided that the resulting tannin containing polymer is still water soluble or dispersible and the total weight % of cationic, nonionic and anionic monomers and tannin adds up to 100%. Preferably, when the cationic monomer and anionic monomer are present together in the tannin containing polymer, the cationic monomer comprises a greater weight percentage than the anionic monomer.

According to one embodiment of the present invention, the copolymer of tannin and cationic monomer contains 20 weight % to 80 weight % of tannin. In another embodiment, the copolymer contains from 30 weight % to 60 weight % of tannin, and in an alternate embodiment, from 30 weight % to 50 weight % of the tannin in the copolymer, provided the total weight of tannin and cationic monomer totals 100 weight %. In another embodiment, the copolymers have a weight % of 30% tannin and 70% cationic monomer, and 50% tannin and 50% cationic monomer. In one embodiment, these particular copolymers may be used when the tannin is a Mimosa type tannin and the cationic monomer is methyl chloride quaternary salt of dimethylaminoethyl acrylate.

In one embodiment, the tannin containing polymer has a concentration of tannin of from about 10% to about 90%, or said cationic monomer has a concentration of from about 20% to about 80%. In another embodiment, the tannin containing polymer has a concentration of tannin of from about 40% to about 70%, or said cationic monomer has a concentration of from about 30% to about 60%.

The resulting tannin containing polymer is water soluble or dispersible. The tannin containing polymers may be prepared by mixing the desired monomers with tannin and initiating by a free radical initiator via solution, precipitation or emulsion polymerization techniques. Conventional initiators include, but are not limited to, azo compounds, persulfates, peroxides and redox couples. Additional initiators include, but are not limited to, 2,2'azobis(2-amidinopropane) dihydrochloride (available as V-50 from Wako Chemicals, Richmond, Va.) and t-butylhydroperoxide/sodium metabisulfite (t-BHP/NaMBS). These or other initiators may be added at the end of polymerization to further react with any residual monomers.

Chain transfer agents such as alcohol, amine, formic acid or mercapto compounds may be used to regulate the molecular weight of the polymer. The resulting polymer may be isolated by well-known techniques including precipitation, or the polymer may simply be used in its aqueous solution.

The tannin containing polymer has a low molecular weight, often less than 100,000 Dalton, less than most reported filterability enhancement polymers, such as polyamine coagulants. With a lower molecular weight, the tannin containing polymers are less sensitive to overdosing which, once it occurs, may result in reduced biological activity and membrane fouling. In one embodiment of the present invention, the tannin containing polymer has a molecular weight of from about 10,000 Da to about 150,000 Da. In another embodiment, the tannin containing polymer has a molecular weight of from about 50,000 Da to about 90,000 Da.

The reaction temperature is not critical. In one embodiment, the reaction temperature is from about 20° C. to about 100° C. In an alternate embodiment, the reaction temperature is from about 40° C. to about 70° C. The pH of the reaction mixture is also not critical and is generally in the range of 2.0 to 8.0. The resulting tannin containing polymers are characterized by C-13 NMR, Brookfield viscosity and percent solids.

The resulting tannin containing polymers should be added to the system to be treated in an amount sufficient for its intended purpose. For the most part, this amount will vary depending upon the particular system for which treatment is desired and can be influenced by such variables as turbidity, pH, temperature, water quantity, MLSS and type of contaminants present in the system. The tannin containing polymers are effective at a wide range of pHs and should prove effective at the pH of any system.

The polymers may be added to the system neat or in solution, either continuously or intermittently. The tannin polymer should not be added directly in contact with the activated sludge at the membrane surface, but rather is added upstream of the membrane surface to ensure complete mixing with activated sludge. While dosing chemicals to the system, there is no immediate or direct contact between the polymer chemicals and the membrane surface. The effective amount of the tannin containing polymer is added to activated sludge of a MBR system. In one embodiment, the tannin containing polymer is well mixed with the mixed liquor prior to being in direct contact with the membrane surface. In another embodiment, the mixing is accomplished by feeding the tannin containing polymer into an area of the bioreactor where an intensive mixing occurs. In an alternate embodiment, the mixing is accomplished by feeding the tannin containing polymer into an area of the MBR where sufficient mixing time occurs, in proximity to a pump station, an aeration nozzle, or a sludge or mixed liquor recycling pipe.

The effective amount of the tannin containing polymer depends on the filterability of the mixed liquor in the MBR system. The characteristics of the mixed liquor, including mixed liquor suspended solids (MLSS) concentration, viscosity, extracellular polymeric substances (EPS), floc size, and colloidal and soluble organic substances all may effect membrane filterability.

In one embodiment, the effective amount of the tannin containing polymer is from about 5 to about 1000 ppm active polymer in the MBR. In an alternate embodiment, the tannin containing polymer is from about 20 to about 50 percent solids. The tannin containing polymer is a solution polymer containing from about 20 percent to about 50 percent active polymer, while the remainder is water. There are different terms to describe the active polymer percentage in polymer solution, such as percent solids, active polymer, and as actives. For a water soluble polymer, actives refers to the active polymer. Since the tannin polymer contains no oil or surfactant, the polymer solids equals the active polymer.

In a typical MBR unit, influent wastewater is pumped or gravity flowed into a bioreactor tank where it is brought into contact with the microorganisms which biodegrade organic material in the wastewater. Aeration means such as blowers provide oxygen to the biomass. The resulting mixed liquor contained in the bioreactor is filtered through membranes under pressure or is drawn through the membrane under vacuum. The membrane may be immersed in the bioreactor tank or contained in a separate membrane tank to which wastewater is continuously pumped from the bioreactor tank. Clarified water is discharged from the system and excess activated sludge is pumped out of the bioreactor tank into a sludge holding tank in order to maintain a constant sludge age (SRT). The filtration membrane is regularly cleaned by backwashing, chemical washing, or both.

An MBR can be configured in various ways. As shown in FIG. 1, wastewater 10 is often pretreated to remove coarse solids, suspended solids, and various fiber materials before entering an MBR system. An MBR system may consist of an anoxic tank 20, an aerobic tank 30, and a membrane tank 40. Membrane filtrate 50 is separated from the activated sludge and exits the membrane. The activated sludge from membrane tank 40 is recycled to either an anoxic tank 60 or an aerobic tank 70. A portion of activated sludge 80 from the membrane tank 40 is drawn out for disposal in order to maintain an appropriate sludge retention time (SRT) in the MBR. One or more polymers and/or inorganic coagulants may be added to the influent wastewater 10, the anoxic tank 20, the aerobic tank 30, and the membrane tank 40.

A MBR system may be comprised of a combination of at least two of the following types of reactors: anaerobic reactors, anoxic reactors, and aerobic reactors. A simplified MBR system may be comprised of just one aerobic tank and the membrane module is submersed in the aerobic tank. Alternatively, the membrane bioreactor may comprise one or more aerobic reactors, one or more anaerobic digesters, or a combination of one or more anaerobic digesters and one or more aerobic reactors. An MBR system couples biological wastewater treatment and membrane filtration. The present invention applies to all MBR systems, whenever a membrane flux enhancement occurs.

Membranes used in the MBR unit include, but are not limited to, ultra-, micro- and nanofiltration, inner and outer skin, hollow fiber, tubular, and flat, organic, metallic, ceramic, and the like. Membranes for commercial application include, but are not limited to, hollow fiber with an outer skin ultrafilter, flat sheet (in stacks) microfilter and hollow fiber with an outer skin microfilter.

Membrane materials may include, but are not limited to, chlorinated polyethylene (PVC), polyvinylidene fluoride (PVDF), polyacrylonitrile (PAN), polysulfone (PSF), polyethersulfone (PES), polyvinylalcohol (PVA), cellulose acetate (CA), regenerated cellulose (RC) as well as inorganics. The tannin containing polymer disclosed in this invention is advantageous over some prior art patents because polyamine based filterability enhancement polymers may have compatibility problem with the membranes and its supports as the amines released from the polymers can react with PVC and PVDF. The tannin containing polymers disclosed in this invention, which preferably do not contain an amine group, have no such problem.

Adding an effective amount of the tannin containing polymer allows for mixed liquor filterability enhancement in MBR systems. In addition, adding an effective amount of the tannin containing polymer improves filtering characteristics of sludge. Adding an effective amount of the tannin containing polymer greatly improves sludge filterability, reduces the risk to the MRB associated with handling peak flows, reduces membrane cleaning requirements, and provides for an MBR system that can be designed at a higher flux rate.

The invention is illustrated in the following non-limiting examples, which are provided for the purpose of representation, and are not to be construed as limiting the scope of the invention. All parts and percentages in the examples are by weight unless indicated otherwise.

EXAMPLE 1

The filterability of mixed liquor was evaluated by the Time-to-Filter (TTF) test method. The TTF test method was adapted from Standard Methods (APHA, 1992), Method #271 OH. The test consisted of placing a mixed liquor sample in a Buchner funnel with a filter paper, applying a vacuum, and measuring the time required to filter 50% of the original mixed liquor sample.

In the TTF tests, one 9-cm Whatman GF/C (Catalog #1822 090) filter paper was placed in a Buchner funnel and was wet to form a good seal. A vacuum pump with a pressure regulator was used, and the vacuum pressure was adjusted to 51 kPa (15 inch Hg). A 200 ml mixed liquor sample was added to the Buchner funnel, and the time to filter 100 ml, which corresponded to 50% of the initial sample volume, was recorded. Time to filter is expressed in seconds and usually varies from 50 seconds to 2000 seconds.

Prior to the TTF test, a standard Jar Test was conducted to ensure that the added chemical was mixed well with the mixed liquor samples. A Jar Tester (Phipps & Bird™) with each jar containing 500 ml mixed liquor sample was used. Once the pre-determined amount of chemical was quickly added to the samples, a rapid agitation at 200 rpm proceeded for 30 seconds, and then a slow agitation speed at 50 rpm followed for 15 minutes. A test was conducted on a control sample, which followed the same Jar Test procedure, but no chemical was added.

Two types of mixed liquor samples were taken for testing. Type A samples were taken from the municipal Wastewater Treatment Plant at GE China Technology Center (samples taken from the activated sludge recycling line where the MLSS concentration was above 10 g/L). Type B mixed liquor samples were taken from a Steel Mill coke plant wastewater treatment plant. A tannin containing polymer chemical product with an active content of 38% was tested for both Type A and Type B mixed liquor samples. Table 1 shows the results for the Type A samples and Table 2 shows the results for the Type B samples.

TABLE 1

TTF Test for Mixed Liquor from Municipal Wastewater Treatment Plant

| Dosage (ppm) | TTF (seconds) | TTF reduction compared to Control |
|---|---|---|
| 0 (control) | 895 | 0.0% |
| 125 | 417 | 53.4% |
| 250 | 113 | 87.4% |
| 400 | 44 | 95.1% |

TABLE 2

TTF Test for Mixed Liquor from Steel Mill Coke Plant Wastewater Treatment Plant

| Dosage (ppm) | TTF (seconds) | TTF reduction compared to Control |
|---|---|---|
| 0 (control) | 1203 | 0.0% |
| 100 | 954 | 20.7% |
| 200 | 761 | 36.8% |
| 500 | 180 | 85.0% |
| 700 | 80 | 93.4% |

The data shows a significant improvement in the filterability of the mixed liquor samples by adding a tannin containing polymer. The experiments showed that up to more than a 90% reduction in TTF can be achieved by dosing an effective amount of the tannin containing polymer for both types of mixed liquor samples.

EXAMPLE 2

The tannin containing polymer can be added in combination with one or more other water soluble sludge filterability improvement polymers to the activated sludge in a MBR for combined membrane filterability enhancement. The tannin containing polymer can also be added in combination with sludge filterability improvement inorganic coagulants to the mixed liquor to improve its filterability.

Following the same procedures as described in Example 1 for both the TTF Test and the Jar Test, a series of tests were conducted to test the combination of the tannin containing polymer and an inorganic alum coagulant on filterability improvement. The alum coagulant product contained 50% actives. The two chemicals were added to the mixed liquor separately. The mixed liquor samples were taken from the municipal wastewater treatment plant at GE China Technology Center (sample taken from the activated sludge recycling line where the MLSS concentration was above 10 g/L). The results are shown in Table 3.

TABLE 3

TTF Test for Tannin Containing Polymer together with an Alum Coagulant

| Polymer dosage (ppm) | Alum coagulant dosage (ppm) | TTF (seconds) | TTF reduction compared to Control |
|---|---|---|---|
| 0 (control) | 0 (control) | 208 | 0.0% |
| 400 | 0 | 30 | 85.6% |
| 250 | 350 | 28 | 86.5% |
| 200 | 350 | 30 | 85.6% |
| 100 | 560 | 24 | 88.6% |

The data shows that the tannin containing polymer can be added together with an alum coagulant to enhance the filterability of the mixed liquor samples. With aid of the alum coagulant, the dosage of the tannin containing polymer can be reduced.

While the present invention has been described with references to preferred embodiments, various changes or substitutions may be made to these embodiments by those ordinarily skilled in the art pertinent to the present invention without departing from the technical scope of the present invention. Therefore, the technical scope of the present invention encompasses not only those embodiments described above, but also all that fall within the scope of the appended claims.

What is claimed is:

1. A method of conditioning mixed liquor in a membrane bioreactor (MBR) system, comprising: adding an effective amount of a tannin containing polymer to the mixed liquor.

2. The method of claim 1 wherein said tannin containing polymer is comprised of a water soluble or dispersible copolymer of a tannin and a cationic monomer selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

3. The method of claim 1 wherein said tannin containing polymer is comprised of a water soluble or dispersible copolymer of a tannin, a cationic monomer selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide and diallyl dimethyl ammonium chloride and at least one monomer selected from the group consisting of an anionic monomer and a nonionic monomer.

4. The method of claim 3 wherein said nonionic monomer is selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, and ethoxylated allyl ether of polyethylene glycol and polypropylene glycol.

5. The method of claim 3 wherein said anionic monomer is selected from the group consisting of acrylic acid, methacrylic acid, vinyl acetic acid, itaconic acid, maleic acid, allylacetic acid, styrene sulfonic acid, 2-acrylamido-2-methyl propane sulfonic acid, and 3-allyloxy-2-hydroxypropane sulfonic acid.

6. The method of claim 1 wherein said tannin containing polymer has a concentration of tannin of from about 10% to about 90%, or said cationic monomer has a concentration of from about 20% to about 80%.

7. The method of claim 1 wherein said tannin containing polymer is from about 20 to about 50 percent solids.

8. The method of claim 1 wherein said effective amount of the tannin containing polymer is from about 5 ppm to about 1000 ppm active polymer in the MBR.

9. The method of claim 1 wherein said tannin containing polymer has a molecular weight of from about 10,000 Da to about 150,000 Da.

10. The method of claim 1 wherein the tannin containing polymer is mixed with the mixed liquor prior to being in direct contact with the membrane surface.

11. The method of claim 10 wherein the mixing is accomplished by feeding the tannin containing polymer into an area of the MBR where an intensive mixing occurs.

12. The method of claim 10 wherein the mixing is accomplished by feeding the tannin containing polymer into an area of the MBR where sufficient mixing time occurs.

13. A method of improving flux in a membrane bioreactor (MBR) system, comprising: adding an effective amount of a tannin containing polymer to mixed liquor of the MBR.

14. The method of claim 13 wherein said tannin containing polymer is comprised of a water soluble or dispersible copolymer of a tannin and a cationic monomer selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

15. The method of claim 13 wherein said tannin containing polymer is comprised of a water soluble or dispersible copolymer of a tannin, a cationic monomer selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide and diallyl dimethyl ammonium chloride and at least one monomer selected from the group consisting of an anionic monomer and a nonionic monomer.

16. The method of claim 15 wherein said nonionic monomer is selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, and ethoxylated allyl ether of polyethylene glycol and polypropylene glycol.

17. The method of claim 15 wherein said anionic monomer is selected from the group consisting of acrylic acid, methacrylic acid, vinyl acetic acid, itaconic acid, maleic acid, allylacetic acid, styrene sulfonic acid, 2-acrylamido-2-methyl propane sulfonic acid, and 3-allyloxy-2-hydroxypropane sulfonic acid.

18. The method of claim 13 wherein said tannin containing polymer has a concentration of tannin of from about 10% to about 90%, or said cationic monomer has a concentration of from about 20% to about 80%.

19. The method of claim 13 wherein said tannin containing polymer is from about 20 to about 50 percent solids.

20. The method of claim 13 wherein said effective amount of the tannin containing polymer is from about 5 ppm to about 1000 ppm active polymer in the MBR.

21. The method of claim 13 wherein said tannin containing polymer has a molecular weight of from about 10,000 Da to about 150,000 Da.

22. The method of claim 13 wherein the tannin containing polymer is mixed with the activated sludge prior to being in direct contact with the membrane surface.

23. The method of claim 22 wherein the mixing is accomplished by feeding the tannin containing polymer into an area of the MBR where an intensive mixing occurs.

24. The method of claim 22 wherein the mixing is accomplished by feeding the tannin containing polymer into an area of the MBR where sufficient mixing time occurs.

25. A method of conditioning mixed liquor and improving flux in a membrane bioreactor (MBR) system, comprising: adding an effective amount of a tannin containing polymer in combination with adding an effective amount of a sludge filterability improvement inorganic coagulant to the mixed liquor.

26. The method of claim 25 wherein the inorganic coagulant is selected from the group consisting of: Ca, Mg, Al, or Fe, and combinations thereof.

* * * * *